June 8, 1954
J. W. WIESMANN
2,680,775
WIRE DISTRIBUTING SYSTEM
Filed March 19, 1949
2 Sheets-Sheet 1
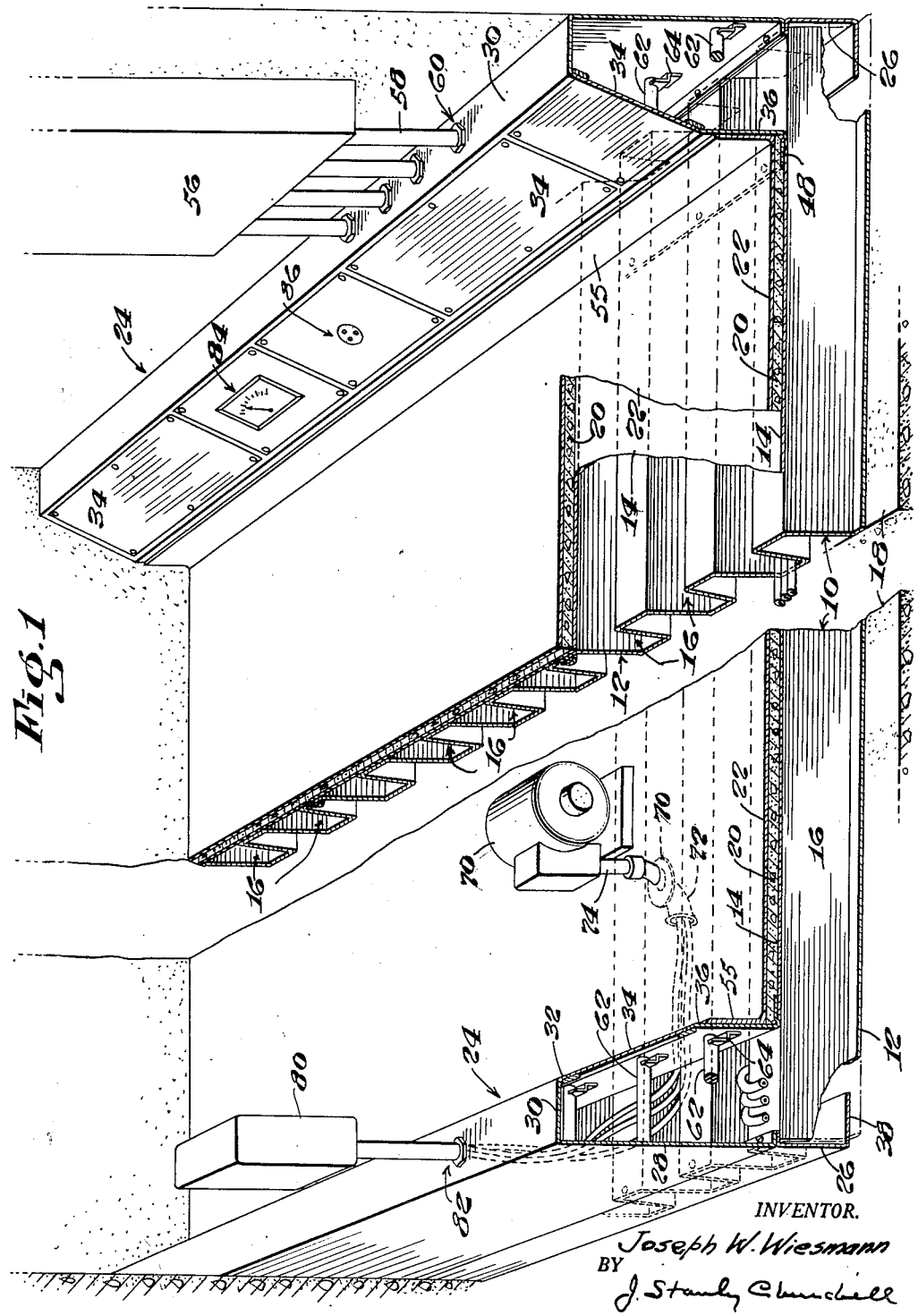
INVENTOR.
Joseph W. Wiesmann
BY
J. Stanley Churchill
ATTORNEY

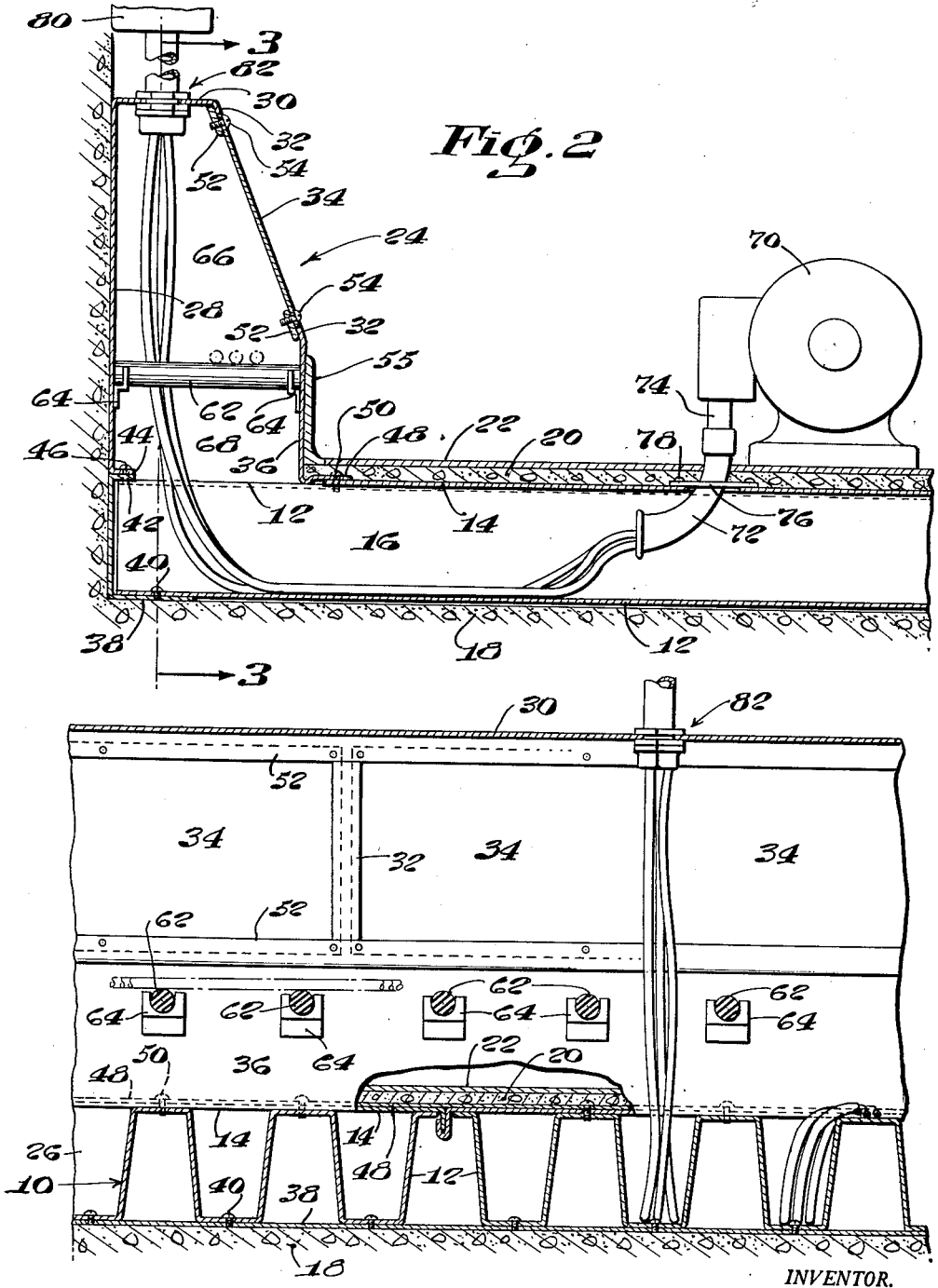

Patented June 8, 1954

2,680,775

UNITED STATES PATENT OFFICE 2,680,775

WIRE DISTRIBUTING SYSTEM

Joseph W. Wiesmann, Pittsburgh, Pa., assignor to H. H. Robertson Company, Pittsburgh, Pa., a corporation of Pennsylvania Application March 19, 1949, Serial No. 82,330

3 Claims. (Cl. 174—95)

This invention relates to a wire distributing system for a building having a multicellular floor.

The invention has for an object to provide a novel and improved wire distribution system of the character specified embodying a transversely extended header or feeder duct of novel construction adapted for cooperation with the cells of the multicellular floor whereby wiring may be conveniently and efficiently furnished to any point selected for service in the different parts of the floor and in which the wiring is readily accessible at all times for maintenance or expansion of the system.

In its preferred form the invention contemplates the provision of a header duct mounted to extend transversely on top of and preferably along one or both ends of the multicellular floor with the lower portion of the duct in direct communication with the open tops of a large number of the cells whereby the feed wires may be distributed to any or all of such cells to furnish service to any selected portion of the floor and with the upper portion of the duct extended a substantial distance above the floor and preferably provided with removable covers providing convenient access to the feed wires contained therein. The upper portion of the header duct may also be used for mounting conveniently accessible controls for controlling the service to the various electrical energy devices connected in the system.

With the foregoing object in view and such others as may hereinafter appear, the invention consists in the wire distributing system embodying a header duct and in the various structures, arrangements and combinations of parts hereinafter described and particularly defined in the claims at the end of this specification.

In the drawings illustrating the preferred embodiment of the invention, Fig. 1 is a perspective view of a wire distribution system embodying the present invention; Fig. 2 is a cross-sectional view in side elevation of a portion of the wire distributing system shown in Fig. 1, and Fig. 3 is a cross-sectional view taken on the line 3—3 of Fig. 2.

In general, the present invention relates to a wire distribution system of the general type disclosed in the United States Letters Patent to J. H. Young, No. 1,855,082, dated April 19, 1932 and No. 2,125,366 dated August 2, 1938 which embody a multicellular metallic floor having spaced cells adapted to be used for the distribution of electrical service.

In accordance with the present invention, a header or feeder duct is arranged to extend transversely of the cells along one or both ends of the multicellular floor, preferably but not necessarily along the end walls of the building, the lower portion of the duct being in direct communication with the open ends or tops of a large number of the cells to permit service to be furnished to any or all of the cells selected. The upper portion of the duct is extended a substantial distance above the top of the floor and may be of suitable size such as to provide ample space for the feeder cables. The upper portion of the duct is also provided with removable cover members for rendering the interior of the duct readily accessible for connecting and distributing the wiring to the selected cells. The present header duct is also conveniently adapted for the mounting of controls, outlet receptacles, indicating devices or the like, thus substantially enhancing the convenience and utility of the header duct.

Referring now to the drawings, in general, 10 represents one type of multicellular metallic flooring used in the erection of buildings, and as herein shown, comprises a plurality of units formed by assembling and uniting together a lower corrugated sheet 12 and an upper flat sheet 14 to form in effect a series of closely spaced parallel hollow beams or cells 16. The flooring may be supported upon the structural steel supporting members of the building, or as herein shown, may be laid upon the concrete base floor slab 18, the multicellular flooring being subsequently covered over by a concrete fill 20 and the finish flooring 22, as illustrated in Fig. 1. In practice, it is preferred to manufacture the multicellular metallic flooring in units of convenient length and during the erection of the floor, the units are laid end to end so that the cells of one unit cooperate with and form extensions of the cells of a second unit to provide a plurality of continuous conduits extending across the building and through which the wiring for electrical service of various types may be drawn.

In accordance with the present invention, the electrical wiring is distributed to the different cells from a header duct, indicated generally at 24, disposed at either one or both ends of the flooring, and is herein shown as extending transversely of the cells along opposed walls of the building and as herein shown in communication with the ends or open tops of the cells along the entire width of the floor.

As herein shown, the upper flat sheet 14 of the multicellular flooring is cut back a substantial distance from the end of the underlying corrugated sheet 12 at each end of the flooring to accommodate the header ducts and to expose the tops of the cells at either end to direct communication with the header ducts 24. The open ends of the corrugated sheets are provided with elongated end closure members 26 and as shown in Fig. 2, each header duct 24 is defined by a vertically extended rear wall 28; a horizontally extended upper wall 30; an inclined front wall portion 32 having a plurality of detachably connected cover plates 34; and a lower front wall portion 36.

In order to connect the header duct 24 to the multicellular floor, the elongated end closure member 26 is provided with an inwardly extended lower flange 38 connected by screws 40 to the underside of the lower walls of the spaced corrugations of the corrugated sheet 12, and an upper flange 42 of the end closure is connected to an inwardly extended flanged portion 44 of the rear wall 28 and to the upper walls of the corrugations of the sheet 12 by screws 46. The front wall portion 36 is provided with a forwardly extended and upwardly offset flanged portion 48 connected to the end of the upper flat sheet 14 by screws 50. The inclined front wall portions 32 may be provided with reenforcing strips 52 adjacent the openings therein and the cover plates 34 may be secured to the strips by screws 54, as illustrated. A suitable base board 55 may be extended along the vertical front wall portion 36, the lower end of the base board resting on top of the concrete floor fill 20, and having a lateral flange arranged in abutting relation to the finish flooring 22, as illustrated in Fig. 2.

From the description thus far, it will be observed that the header duct 24 is connected at its lower end to the multicellular floor and in direct communication with all of the cells across the entire width of the flooring, and the upper portion of the header duct extends a substantial distance above the flooring providing ample space for carrying the feed cables longitudinally of the duct and maximum accessibility and convenience for connecting and distributing the wires to any selected cell leading to the part of the floor to be serviced.

In practice, the main feed cables may be supplied to the header duct 24 from a wall panel, cabinet or other box, indicated at 56, through conduits 58 connected to the top of the duct in the horizontally extended wall 30 by suitable coupling connections 60, as indicated in Fig. 1. Provision is made for supporting the longitudinally extended cables in the upper portion of the header duct above the flooring so that the lower area of the duct, in communication with the open ends of the cells, may be maintained free of wiring except at the cells to which the wiring is distributed. As herein shown, the longitudinally extended feed wires may be supported upon and suspended between removable, transversely extended, insulating supports 62 which may comprise cylindrical fiber rods supported at both ends in open slotted brackets 64 secured to the front and rear walls of the duct, as illustrated. The rods 62 may be disposed in predetermined spaced relation above the top of the flooring and in vertical alignment with the spaces between adjacent underlying cell openings so as to leave the cell openings clear of obstructions and readily accessible for distribution of the wiring. In practice, the insulated supporting rods 62 may be easily removed when desired by merely lifting the rods out of the slotted brackets 64 to facilitate handling or distribution of the wiring or for other purposes, whereupon the rods may be replaced. Thus, in effect, the rods 62 separate the header duct into upper and lower wire chambers 66, 68 from which the wires may be distributed to the various cells.

As illustrated in Fig. 2, a typical connection to an electrical energy device, herein shown as an electric motor 70, may include wiring fed from the header duct 24 to the cell 16 and through a cell fitting, indicated generally at 72, and conduit connection 74 to the motor. As herein shown, the cell fitting 72 is extended through an opening formed in the floor and through the upper flat sheet 14 of the multicellular flooring into the cell 16, the cell fitting having a flanged portion 76 secured to the sheet 14 by screws 78. The starter, switch or other control box for the motor 70, indicated generally at 80, may be conveniently connected to the top of the header duct 24 by suitable conduit and coupling connections 82, as illustrated.

In practice, and as illustrated in Fig. 1, the removable cover members 34 may vary in length and may be used to support various types of control such as starter switches, meters for local testing use, as indicated at 84, or a receptacle or other service outlet, indicated at 86, thus providing conveniently accessible controls or other attachments directly connected to the header duct. The present wire distribution system embodying the header duct 24 further lends itself to various types of control systems wherein for example one or more centrally disposed control pulpits may be connected to the various electrical energy devices through the cells and the header ducts at both ends of the cells for continuous control and supervision. In some instances, the header duct 24 may be disposed intermediate the ends of the multicellular floor for cooperation with supervisory or other control units for interconnecting, signalling, or other devices, the upper sheet 14 of the floor being cut out at the required location to accommodate the header duct. In any event, the header duct is disposed transversely of the cells and extended above the floor surface and in direct communication with all of the cells across the entire width of the floor. In practice, the multicellular floor may take various forms made up from corrugated and flat sheets or a combination of two corrugated sheets or the illustrated floor made up from a lower corrugated sheet and an upper flat sheet may be employed in an inverted position, such various forms being modified to accommodate the present header duct.

From the above description it will be observed that the present wire distributing system embodying a transversely extended header duct in direct communication with a larger number of the cells of the multicellular floor and extended a substantial distance above the surface of the floor is of distinct advantage in that the wiring is readily and conveniently accessible for facilitating initial installation or for maintenance of the system or for subsequent expansion of the system, and also lends itself to the provision of easily accessible control units directly attached or connected to the header duct.

While the preferred embodiment of the invention has been herein illustrated and described, it will be understood that the invention may be embodied in other forms within the scope of the following claims.

Having thus described the invention, what is claimed is:

1. A header duct for use with and adapted to be supported on top of a multicellular floor forming underlying longitudinally extended wiring cells having openings in the top thereof for communication with the header duct, said header duct comprising an elongated and transversely extended hollow member open at the bottom and defined by a vertically extended rear wall, a horizontally extended top wall, a forwardly inclined front wall portion, and a vertical front wall portion, and a plurality of spaced and removably mounted insulating wire supporting rods extended between the front and rear walls of said duct.

2. A header duct for use with and adapted to be supported on top of a multicellular floor forming underlying longitudinally extended wiring cells having openings in the top thereof for communication with the header duct, said header duct comprising an elongated and transversely extended hollow member open at the bottom and defined by a vertically extended rear wall, a horizontally extended top wall, a forwardly inclined front wall portion, a vertical front wall portion, and a plurality of spaced and removably mounted insulating wire supporting rods extended between the front and rear walls of said duct, and a plurality of removable cover members attached to said inclined front wall portion to afford convenient access to the interior of the duct.

3. A header duct for use with and adapted to be supported on top of a multicellular floor forming underlying longitudinally extended wiring cells having openings in the top thereof for communication with the header duct, said header duct comprising an elongated and transversely extended hollow member open at the bottom and defined by a vertically extended rear wall, a horizontally extended top wall, a forwardly inclined front wall portion, a vertical front wall portion, and a plurality of spaced and removably mounted insulating wire supporting rods extended between the front and rear walls of said duct, a plurality of removable cover members attached to said inclined front wall portion to afford convenient access to the interior of the duct, said removably mounted rods being disposed below said removable covers and disposed to separate the ducts into upper and lower wire chambers.

References Cited in the file of this patent

UNITED STATES PATENTS

| Number | Name | Date |
|---|---|---|
| 299,992 | Magner | June 10, 1904 |
| 1,437,324 | Tashjian | Nov. 28, 1922 |
| 1,797,164 | Tashjian | Mar. 17, 1931 |
| 1,958,927 | Reske et al. | May 15, 1934 |
| 1,981,239 | Manske | Nov. 20, 1934 |
| 1,986,122 | Sargent | Jan. 1, 1935 |
| 1,986,874 | Arnold | Jan. 8, 1935 |
| 2,029,549 | Winterich | Feb. 4, 1936 |
| 2,039,982 | Schaller | May 5, 1936 |
| 2,259,674 | Wiesmann | Oct. 21, 1941 |